UNITED STATES PATENT OFFICE.

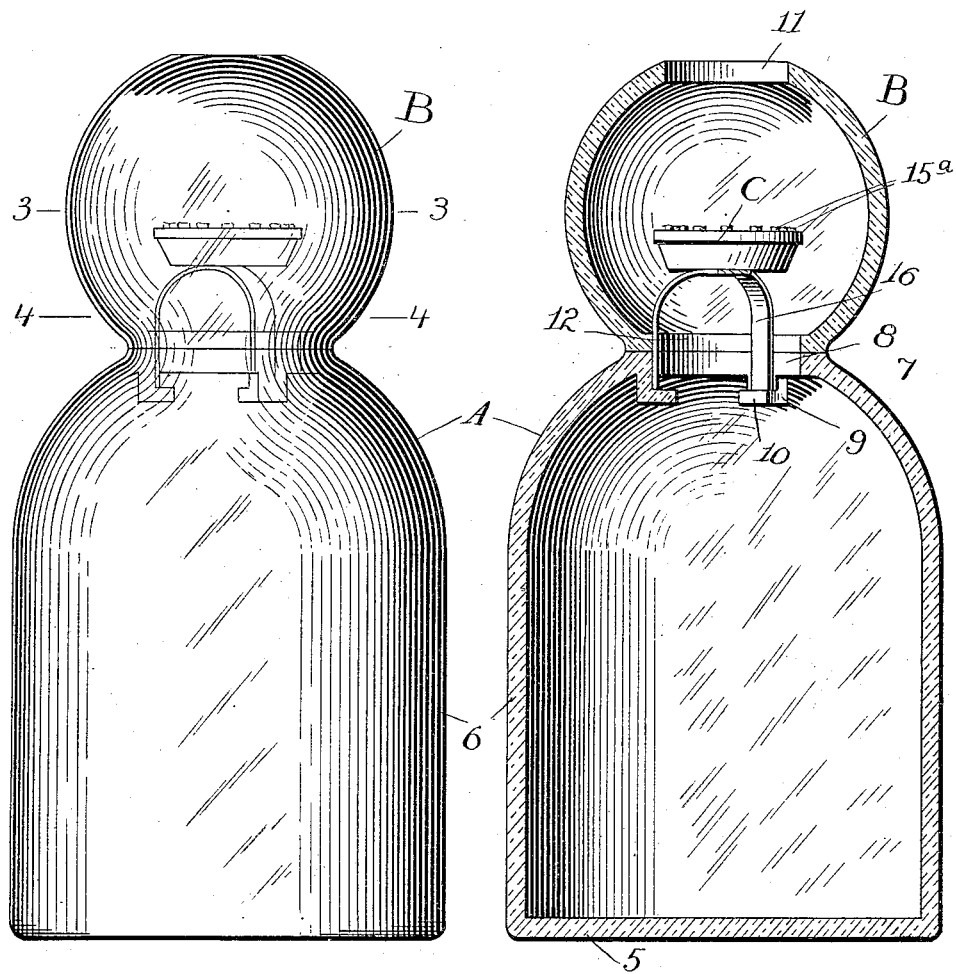

MAYFIELD F. HUNT, OF WHITE SULPHUR SPRINGS, MONTANA.

FLY-TRAP.

1,048,971. Specification of Letters Patent. Patented Dec. 31, 1912.

Application filed April 15, 1912. Serial No. 690,849.

*To all whom it may concern:*

Be it known that I, MAYFIELD F. HUNT, a citizen of the United States, residing at White Sulphur Springs, in the county of Meagher, State of Montana, have invented certain new and useful Improvements in Fly-Traps; and I do hereby declare the following to be a full, clear, and exact description of the invention, such as will enable others skilled in the art to which it appertains to make and use the same.

This invention relates to improvements in fly traps.

The principal object of the invention is to provide a trap in which there is arranged a receptacle for catching the flies after they have been killed by partaking of a poisonous liquid which is supported above the mouth of the receptacle.

Another object of the invention is to provide a novel arrangement for guiding the dead flies into the mouth of the receptacle.

A still further object of the invention is to provide a trap of the character described which is extremely simple in construction, it being composed of a minimum number of parts, and is therefore cheap to manufacture.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction within the scope of the claims may be resorted to without departing from the spirit or sacrificing any of the advantages of the invention.

Figures 3, 4:
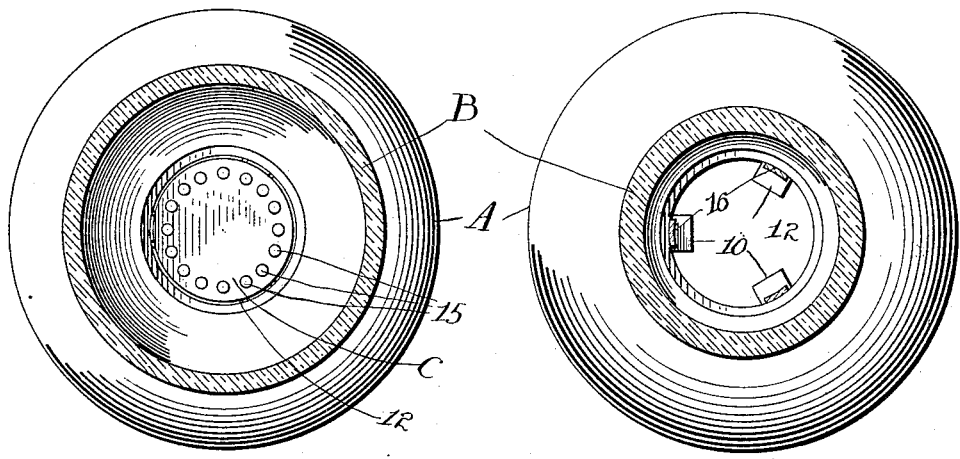
Figure 5:
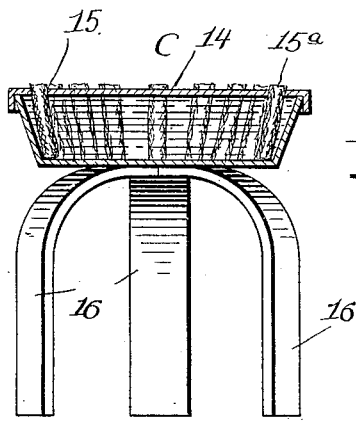

In the drawings: Figure 1 is a side elevation of a trap constructed in accordance with my invention, Fig. 2 is a vertical sectional view therethrough, the tank being shown in elevation, Fig. 3 is a horizontal sectional view taken on the line 3—3 of Fig. 1, Fig. 4 is a detail horizontal sectional view taken on the line 4—4 of Fig. 1, and Fig. 5 is an enlarged vertical sectional view through the tank.

Like reference numerals designate corresponding parts in all the figures of the drawings.

Referring to the drawings, A designates a fly receptacle which is preferably formed of glass although any other suitable material may be employed if desired. This receptacle preferably includes a circular bottom 5 and a peripheral wall 6, the upper portion thereof curving inwardly, as at 7, to form a resultant mouth 8. Extending downwardly from the mouth 8 is a plurality of supporting lugs 9, each lug terminating in an inwardly extending lateral end portion 10, which is disposed below and in spaced relation to the mouth 8.

Detachably seated upon the mouth 8 of the receptacle A is a hollow head B which is also preferably formed of glass although any other suitable material may be employed if desired. This head is preferably spherical in contour, and is formed with diametrically opposed upper and lower openings 11 and 12 respectively, the lower opening registering with the mouth 8 of the receptacle A.

Disposed within the head B above and in spaced relation to the lower opening 12 thereof is a tank C for containing any suitable poisonous liquid. This tank is provided with a removable closure element 14, and this element is formed with a plurality of marginal openings 15 which register with the interior of the tank, and these openings are filled with wicks 15ª. This tank is supported by a plurality of spring legs 16, said legs resting upon the lateral end portions 10 of the lugs 9. It will be observed in this connection that the legs 16 bear against the walls of the mouth 8 and opening 12, and thereby prevent lateral movement of the head B with respect to the receptacle A.

In practice, flies are attracted by the odor from the poisonous liquid and enter the head B through the opening 11. After partaking of the liquid with which the wicks 15ª are saturated, the flies by their feeble efforts to leave the head B will drop from the tank C onto the lower portion of the head B. On account of the head being of spherical contour, these flies will readily drop through the lower opening 12, thence through the mouth 8 and into the receptacle A where they will accumulate.

When it is desired to remove the dead flies from the receptacle A, the head B and tank C may be readily removed and the flies discharged through the mouth 8 of the receptacle, as will be readily understood.

What is claimed is:

1. In a fly trap, the combination with a receptacle having a mouth, of a plurality of supporting lugs extending inwardly from the mouth, each lug terminating in an inwardly extending lateral portion, and a poison containing tank supported by the lugs and disposed in spaced relation to the mouth of the receptacle.

2. In a fly trap, the combination with a receptacle having a mouth, of a plurality of supporting lugs extending inwardly from the mouth, each lug terminating in an inwardly extending lateral portion, a poison containing tank disposed above and in spaced relation to the mouth, and a plurality of supporting legs connected to the tank and resting upon the laterally extending end portion of the lugs.

3. In a fly trap, the combination with a receptacle having a mouth, a hollow head disposed upon the receptacle and formed with upper and lower openings, the lower opening registering with the mouth of the receptacle, a poison containing tank disposed within the head above and in spaced relation to the lower opening thereof, and supporting spring legs for the tank projecting through the lower opening of the head and the mouth of the receptacle.

In testimony whereof, I affix my signature, in presence of two witnesses.

MAYFIELD F. HUNT.

Witnesses:
C. A. LINN,
W. L. FORD.

Copies of this patent may be obtained for five cents each, by addressing the "Commissioner of Patents, Washington, D. C."